US012680376B2

(12) United States Patent
Fischer

(10) Patent No.: US 12,680,376 B2
(45) Date of Patent: Jul. 14, 2026

(54) DOOR HAVING A FUNCTIONAL FILM

(71) Applicant: Seuster KG, Lüdenscheid (DE)

(72) Inventor: Jörg Fischer, Dortmund (DE)

(73) Assignee: Seuster KG, Lüdenscheid (DE)

( * ) Notice: Subject to any disclaimer, the term of this patent is extended or adjusted under 35 U.S.C. 154(b) by 371 days.

(21) Appl. No.: 18/546,861

(22) PCT Filed: Mar. 2, 2022

(86) PCT No.: PCT/EP2022/055259
§ 371 (c)(1),
(2) Date: Aug. 17, 2023

(87) PCT Pub. No.: WO2022/184766
PCT Pub. Date: Sep. 9, 2022

(65) Prior Publication Data

US 2024/0133234 A1 Apr. 25, 2024
US 2024/0229550 A9 Jul. 11, 2024

(30) Foreign Application Priority Data

Mar. 5, 2021 (DE) ......................... 102021105368.4

(51) Int. Cl.
*E06B 9/15* (2006.01)

(52) U.S. Cl.
CPC ......... *E06B 9/15* (2013.01); *E06B 2009/1511* (2013.01); *E06B 2009/1566* (2013.01)

(58) Field of Classification Search
CPC ..... E06B 9/11; E06B 9/13; E06B 9/15; E06B 2009/135; E06B 2009/1511; E06B 2009/1566
See application file for complete search history.

(56) References Cited

U.S. PATENT DOCUMENTS 6,331,343 B1 * 12/2001 Perez ...................... B32B 27/12 428/152
8,079,399 B2 * 12/2011 Rejc ........................... B60J 5/14 160/264
10,107,023 B2 * 10/2018 Fischer ................... E05D 15/38
11,536,084 B2 * 12/2022 Fischer ..................... E06B 9/13
(Continued)

FOREIGN PATENT DOCUMENTS

AU 2019292500 A1 * 2/2021 ............... E06B 9/15
DE 3609194 A1 9/1987
(Continued)

OTHER PUBLICATIONS

DE 3609194 machine translation (Year: 1987).*

*Primary Examiner* — Abe Massad
(74) *Attorney, Agent, or Firm* — Schwabe, Williamson & Wyatt, P.C.

(57) ABSTRACT

A door, in particular a rolling door, comprising a door leaf that can be moved along a track including a deflecting portion between an open position, in which it at least partially exposes a wall opening, and a closed position, in which it at least partially closes the wall opening, which includes at least one bending region that is deformable during the door leaf movement along the deflecting portion and is made of a flexible base material such as polycarbonate, wherein a functional film is laminated onto at least one part of at least one bounding surface of at least one bending region.

21 Claims, 9 Drawing Sheets

(56) References Cited

U.S. PATENT DOCUMENTS

| | | | | |
|---|---|---|---|---|
| 2017/0182693 | A1 * | 6/2017 | Haak | C08K 5/3465 |
| 2020/0131845 | A1 * | 4/2020 | Fischer | E06B 9/17076 |
| 2021/0131178 | A1 * | 5/2021 | Fischer | E06B 9/171 |
| 2021/0262281 | A1 * | 8/2021 | Brunton | E06B 9/13 |
| 2022/0298848 | A1 * | 9/2022 | Fischer | E06B 9/17076 |

FOREIGN PATENT DOCUMENTS

| | | | | |
|---|---|---|---|---|
| DE | 3733778 | A | 4/1989 | |
| EP | 3805513 | A1 * | 4/2021 | E06B 9/13 |
| GB | 1593709 | A | 7/1981 | |
| WO | 2018102892 | A1 | 6/2018 | |
| WO | 2018219512 | A1 | 12/2018 | |

* cited by examiner a)

b)

DOOR HAVING A FUNCTIONAL FILM

CROSS REFERENCE TO RELATED APPLICATION

The present application is a 35 U.S.C. § 371 national phase entry application of, and claims priority to, International Patent Application No. PCT/EP2022/055259, filed Mar. 2, 2022, which claims priority to German Patent Application No. DE 102021105368.4, filed Mar. 5, 2021, the disclosures of which are hereby incorporated by reference in their entirety for all purposes.

BACKGROUND

The invention relates to a door, in particular a rolling door, having a door leaf, which is movable along a track that has a deflecting portion between an open position, in which it at least partially exposes a wall opening, and a closed position, in which it at least partially closes the wall opening, and which includes at least one bending region made of a flexible base material, such as polycarbonate, deformable during the door leaf movement along the deflecting portion.

Such doors are implemented, for example, as so-called rolling doors, in which the door leaf forms a possibly multi-layered roll above the wall opening in the open position. The door leaf can include a number of door leaf segments arranged one behind the other in the door leaf movement direction, wherein at least one stabilizing device extending perpendicular to the door leaf movement approximately in the horizontal direction or approximately perpendicular to the movement track is arranged between two door leaf segments and the edge regions of the door leaf segments facing toward one another and extending approximately perpendicular the movement track are held on the stabilizing device.

When entering the open position and in the open position itself, the door leaf segments are deflected. This portion of the track is also referred to hereinafter as the deflecting portion. In known rolling doors having the construction just described according to WO 2018/219512 A1, the door leaf segments are made of a flexible base material, such as polycarbonate, which allows the door leaf segments to bend following the deflecting portion. These door leaf segments, also referred to below as panes, thus form bending regions of the door leaf at least in the region between the stabilizing devices.

The well-known rolling doors can also be used as so-called high-speed doors for closing industrial halls. The stabilization of the door leaf movement by the stabilizing devices arranged between the individual door leaf segments, together with the flexible design of the door leaf segments themselves, enables door leaf speeds during the opening movement and the closing movement of 2 m/sec or more.

During the operation of the known high-speed doors, damage is observed in many cases, in particular in the region of the outer delimiting surface of the bending regions facing away from the space to be closed. On the one hand, this damage can be traced back to contacts between successive layers of the roll in the deflecting region, which in many cases cannot be avoided during high-speed operation. On the other hand, this damage is also caused by external influences, such as environmental influences. Damage caused by environmental influences can also occur in industrial portional doors having window elements made of flexible plastics such as SAN or polycarbonate. In the case of industrial portional doors, these window elements are usually framed in aluminum frames that completely surround the window elements. To avoid damage and to improve the scratch resistance, a hard coating is used in these known products, wherein which the window elements are vapor deposited or coated.

In attempts to avoid damage in the bending region of the doors described at the outset by using appropriate coatings and to increase their scratch resistance in order to maintain the desired external appearance of these doors in the closed state over a longer period of time, it has been shown that, despite the coating, impairments of the external appearance of the door leaves are observed, however, some of which go beyond the impairments observed with uncoated products.

SUMMARY OF THE INVENTION

In view of these problems in the prior art, the invention is based on the object of providing doors having door leaves including bending regions, in particular rolling doors, whose external appearance is hardly impaired even in high-speed operation and under demanding weather conditions, and of specifying methods for producing such doors.

According to the invention, this object is achieved by a refinement of the known doors, which is essentially characterized in that a functional film is laminated onto at least one part of at least one bounding surface, in particular the outer bounding surface facing away from the space to be closed using the door leaf in the closed position, of at least one bending region.

This invention is based on the finding that the coating with a hard coating used successfully in industrial portional doors on a bending region subjected to bending in the course of the door leaf movement results in the formation of microcracks, which in many cases impair the external appearance more severely than those impairments arising during the door leaf movement without appropriate equipment of the bending regions and/or weather influences. The dynamic loads that regularly occur in the deflecting region during the course of the opening and closing movement result in the observed defects.

Within the scope of the invention, instead of a vapor-deposited hard coating, a functional film, i.e., a structurally coherent planar formation, is applied to at least part of a bounding surface of a bending region. In contrast to a vapor-deposited coating, the structural properties of the functional film can be adjusted in such a way that they can follow the regular dynamic loads during door leaf operation. For this purpose, the films can be provided with a corresponding deformability, in particular elastic deformability and/or extensibility, which can easily manage the alternate bending (expansion and compression) when passing through the deflecting portions. During the process of laminating the functional film, a bounding layer can be formed between the base material and the functional film, which also withstands the load changes that occur without being damaged.

Surprisingly, it has been shown that the laminated film also counteracts the development of noise. On the one hand, this becomes clear in connection with the reduction in extending noises caused by the door leaf movement. On the other hand, a reduction in rattling noises when there is external pressure against the door leaf in the closed position can be determined, in particular if a part of the door leaf including the bending region is mounted in a floating manner (see below). Furthermore, the laminated functional film can reduce noise emissions from a hall closed using the door leaf.

The functional film laminated onto the base material according to the invention can also give the door leaf a desired external appearance additionally or alternatively to the improved resistance with regard to impairments of the external appearance. If the priority when selecting the functional film is to avoid impairments to the external appearance, it is preferred within the scope of the invention if a bounding surface of the functional film facing away from the base material has a higher scratch resistance according to DIN EN ISO 12137 than the base material. The functional films can be made transparent overall. However, the use of colored films is also contemplated, which, in addition to the desired colored impression, can also give the bending region improved mechanical properties.

The functional films can be mixed with coloring pigments and/or provided with appropriate translucent tints. They can be provided with various types of filters or mirrors. A mirrored film protects against sunlight in regions with high levels of solar radiation with incident light at the same time. A bounding surface of the functional film facing away from the base material can be at least partially mirrored and/or provided with a decoration, such as a decoration with a carbon look, wood look, or brushed aluminum.

In addition to the desired improved resistance to weather influences and/or damage occurring during door leaf operation, the use of functional films proposed according to the invention gives enormous scope for door design. This is of particular importance when the bending regions, such as the panes or door leaf segments of the known rolling doors accommodated between stabilizing devices, form up to 90 percent or more of the entire door leaf surface.

A corresponding scope for design can hardly be implemented in an economically sensible manner by selecting the base materials for the bending region, because these base materials, such as polycarbonate sheets, can only be obtained with color pigments or special equipment for very large purchase quantities, so that a design of the optical appearance via the starting material for the bending region is hardly economically viable.

In contrast, functional films that can be used within the scope of the invention are available in a large variety. If they have a thickness of 0.2 mm or less, in particular 0.15 mm or less, but at least 0.01 mm, preferably at least 0.04 mm, they can be used without appreciably negatively affecting the overall mass of the door leaf, but can be laminated onto the base material with sufficient mechanical stability to obtain the desired function.

The functional film can be laminated onto the base material by means of an adhesive, such as a pressure-sensitive acrylate adhesive. A corresponding adhesive is characterized by sufficient elasticity while ensuring sufficient adhesion. If a pressure-sensitive adhesive is used, the functional film can also be repositioned. In the production of doors according to the invention, the adhesive can be provided in the form of an adhesive layer of the functional film which, after being laminated onto the base material, forms a bounding layer between the base material and other film layers of the functional film. In other embodiments of the invention, the base material itself is provided with the adhesive before the lamination.

In order to obtain the desired properties of the functional film, it can include a PVC layer. Functional films that can be used to produce doors according to the invention and that are already provided with a pressure-sensitive acrylate adhesive as a preliminary product are offered under the trade names 3M™ Wrap Film 2080 and 3M™ Scotchcal™ Film Clear View 8150. These functional films include a cast PVC layer and a layer of pressure-sensitive acrylate adhesive. The cast PVC layer can have a layer thickness of 50 μm to 100 μm. The adhesive layer can have a thickness of less than 30 μm.

The various functional films having a cast PVC layer and a pressure-sensitive acrylate adhesive are used with particular advantage in connection with a base material made of polycarbonate. As already explained, the door leaf preferably forms a multi-layer roll in the open position.

Films known under the trade name "3M™ Obsidian sun protection film" are used with particular advantage within the scope of the invention. These films are described in WO 2015/134824 A2. The disclosure content of this specification with regard to the structure and the composition of the films mentioned is hereby incorporated into this description by express reference. 3M™ Obsidian sun protection film comprises a clear first outer layer comprising polyethylene terephthalate (PET), a dye-infused core layer comprising PET comprising one or more selected dyes from the group consisting of Pigment Yellow 147, Pigment Red 177, Pigment Blue 60, Pigment Black 31, Pigment Red 149, and Pigment Red 122. The films furthermore comprise a second outer layer comprising PET. After irradiation of 300 MJ/m$^2$ total irradiance integrated over the band from 259 nm to 385 nm and time, the film is fade-proof. The Obsidian sun protection film can optionally be laminated onto the base material using a pressure-sensitive acrylate adhesive.

The door leaf can include a plurality of door leaf segments arranged one behind the other in the door leaf movement direction, at least one of which comprises a bending region, wherein at least one stabilizing device extending perpendicularly to the door leaf movement direction is arranged between two door leaf segments and the edge area of the door leaf segments facing toward one another are held on the stabilizing device and at least one edge region of at least one segment is held floating on the stabilizing device in such a way that a relative movement of this edge region with respect to the stabilizing device is possible at least in the door leaf movement direction. Impairment of the visual appearance of corresponding rolling doors is reduced if the edge region of at least one segment, which can also be referred to as the bending region of this segment at the same time, is provided with a functional film. In this case, due to the floating mounting, the functional film can effectively reduce grinding tracks to be handled in the edge region of the segment.

In the doors just described, of the type described in WO 2018/219512 A1, to guide the door leaf movement, joint assemblies can be provided on edges of the door leaf that extend at least in portions in the direction of gravity in the region of the closed position and are fastened to the door leaf, each of which can include a plurality of joint members which are connected to one another in an articulated manner with respect to joint axes extending perpendicularly to the lateral edges and approximately parallel to the plane of the door leaf. According to the document mentioned, the space required in the open position is reduced in that at least some of the segments of the door leaf are made of a flexible base material, such as a polycarbonate sheet, to provide bending regions, which adapts itself to the roll to be formed in the open position and allows a small spiral diameter in the open position. Within the scope of the present invention, the segments of the known doors can be provided with a functional film.

By guiding the door leaf with the help of the joint members of the joint assembly coupled to the stabilizing device, tensile or shear forces occurring during the door leaf movement can be transmitted via the joint assembly, so that reliable guidance of the door leaf movement is possible even at high door travel speeds if care is taken that the stabilizing devices of the door leaf are securely coupled to the joint members of the joint assembly. With the kinematics described, in which shear and tensile forces are transmitted via the framework formed by the joint assembly and the stabilizing device, considerable forces still occur in the region of the transition between the stabilizing devices and the edge regions of the door leaf segments. These forces occur in particular during the transition to the open position and the deflecting of the door leaf movement caused there to obtain a multi-layer roll, wherein particularly high forces are observed when the door leaf segments include a flexible base material.

Although impairments of the segments that occur within the scope of this invention can already be reduced by using a functional film, it has also proven to be particularly useful for doors according to the invention if impairments can be prevented by floating mounting of the door leaf segments with respect to the stabilizing device, whereinout thereby negatively affecting the overall stability of the overall construction. Within the scope of this invention, the floating mounting of the door leaf segments and the use of a functional film in the region of this floating mounting work together synergistically to avoid visual impairments. Within the scope of this invention, use can also be made of the fact that stabilizing devices and any joint assemblies that are present form a stable framework via which forces arising during the door leaf movement can be transmitted without the need for rigid fastening of the door leaf segments possibly provided with a functional coating to the stabilizing devices being required. Therefore, a floating mounting, which allows a relative movement of the edge regions of the door leaf segments with respect to the stabilizing device, can be implemented without the door leaf movement or the stability of the entire door construction being impaired.

On the other hand, the floating mounting allows any play that may occur during the door leaf movement or relative movements between the stabilizing device and the door leaf segment to be absorbed without the door leaf construction being damaged or visually impaired by excessive force, wherein the visual impairments, as already explained, can also be counteracted by equipping the door leaf segments with a functional film.

The floating mounting can not only allow a relative movement between the edge region of the door leaf segment and the stabilizing device in the door leaf movement direction, but possibly also in a direction extending parallel to the floating-mounted edge region or perpendicular to the door leaf movement direction, so that even with corresponding minor deviations in the door leaf movement from the specified track, hardly any damage to the door leaf segments occurs. A synergistic effect can also be achieved at this point by the use of a functional film proposed according to the invention.

In order to prevent the door leaf segments from becoming detached from the stabilizing devices, it has proven to be expedient if the relative movement of the floating-mounted edge region of at least one door leaf segment with respect to the stabilizing device is limited with the aid of a limiting assembly, wherein the limiting assembly becomes active in particular in the case of a relative movement in a direction extending parallel to the door leaf movement direction.

In a particularly preferred embodiment of the invention, the limiting assembly includes an extension of the floating edge region in a thickness direction extending perpendicular to the door leaf plane spanned by the door leaf movement direction and the stabilizing device and a receptacle formed in the stabilizing device for the extension of the edge region held floating, wherein the receptacle has a mouth penetrated by a transition region of the segment between the extension and an region of the segment exposed outside of the stabilizing device, the width of which in the thickness direction is greater than the thickness of the transition region in the thickness direction, but less than the dimensions of the extension in the thickness direction.

In this embodiment of the invention, the stabilizing device according to WO 2018/219512 A1 is expediently designed as a stabilizing profile having a receptacle region for receiving the extension of the edge region of the door leaf segment, wherein the receptacle of the stabilizing profile is matched to the dimensions of the door leaf segment such that the door leaf segment is held with play and without a clamping effect on the stabilizing profile. By matching the dimensions of the extension to the mouth of the receptacle, the edge region of the door leaf segment cannot be pulled out of the receptacle in a direction extending parallel to the door leaf movement direction.

A further limitation of the relative movement of the edge region of the door leaf segment with respect to the stabilizing device or the stabilizing profile can be achieved if the receptacle is delimited by a base on its side opposite to the mouth, wherein the distance between the mouth of the receptacle and the base is greater in the door leaf movement direction than the length of extension of the floating-mounted edge region in the door leaf movement direction. The possible play of the floating mount of the edge region with respect to the stabilizing profile is determined by the difference in dimensions.

In a particularly preferred embodiment of the invention, the door leaf segment is formed by a web-like material, wherein the extension of the door leaf segment can be formed by bending the floating edge region with respect to a bending axis extending parallel to the stabilizing device. In this embodiment of the invention, no additional component is required to form the extension of the door leaf segment. The bending of the door leaf segment in the edge region extending perpendicularly to the movement direction can be carried out, for example, by a roll forming process. The edge region of the door leaf segment can be bent back onto itself, for example in the manner of a hook, in order to obtain an extension of the floating-mounted edge region in the thickness direction.

As can be seen from the above explanation of products according to the invention, a method according to the invention for producing a door according to the invention is essentially characterized in that a functional film is laminated onto a base material made of flexible material. The functional film can include an adhesive layer, using which it is adhesively fixed on the base material.

For lamination, the functional film can pass through a nip formed between two rollers of a laminator together with the base material. In terms of avoiding bubble formation when laminating the functional film, it has proven to be advantageous within the scope of the invention if fluids are drained from a bounding layer formed between the functional film and the base material through fluid channels of the functional film when laminating the functional film. These fluid channels can be provided in the adhesive layer of the functional film.

If the wall region of the door leaf segment is to be bent back onto itself in the manner of a hook in the sense explained above, it has proven to be advantageous in the scope of the production of doors according to the invention if the functional film is laminated on a flexible base material in the form of a plastic web preferably at least partially consisting of polycarbonate and/or or SAN existing and an edge of the plastic web provided with the functional film is bent over with respect to a bending line extending parallel to this edge. If the segment prepared in this way is inserted into the stabilizing device, improved wear resistance can be achieved in the region of the floating mount of the segment.

In another embodiment of the invention, the extension can be formed by thickening the edge region, in particular by gluing and/or welding on a welt. Both the extension of the door leaf segment formed by bending over the floating-mounted edge region and the extension formed by gluing and/or welding on a welt can extend over the entire width of the door leaf. However, such embodiments are also considered in which the extension extends over only part of the entire width of the door leaf. In particular in the last-described embodiment of the invention, the extension can also be formed by individual extension elements applied to an edge of the door leaf segment, which are designed, for example, in the manner of clamp elements. Such extension clamps can be U-shaped components, which can be formed from sheet metal, for example. Hook-shaped projections can be provided in the region where these extension clamps are attached to the door leaf segment to create a form-fitting connection between the extension clamps and the edge of the door leaf segment, which is made of plastic, such as polycarbonate. The hook-shaped projections can also be designed as barbs. When the extension clamps are pushed onto the door leaf edge, the extension clamps dig into the door leaf segments and prevent the door leaf segment from being pulled out of the receptacle of the stabilizing device. The extension clamps can extend over the entire width of the door leaf segment. However, such embodiments are also considered in which two, three, or more extension clamps are fixed at a distance from one another on an edge of the door leaf segment.

With regard to the assembly of a door according to the invention, it has proven to be particularly advantageous if the stabilizing device includes at least two receptacle parts which are detachably connected to one another and which form opposite boundaries of the mouth. In this embodiment of the invention, the edge region of the door leaf segment including the extension can first be placed against a bounding surface of a first receptacle part that delimits the mouth in a direction extending perpendicular to the main surface of the door leaf segment or door leaf plane, and then the second receptacle part that forms a further bounding surface of the mouth can be attached, wherein a formfitting connection between the two receptacle parts is possible. For example, the other receptacle part can be clipped onto the first receptacle part.

If the stabilizing device has two receptacles spaced apart from one another in the door leaf movement direction for receiving the edge regions of adjacent door leaf segments facing toward one another, it has proven to be particularly useful if the upper receptacle in the closed position and the corresponding mouth are delimited by two receptacle parts that are detachably connected to one another. In this case, an upper edge of a door leaf segment can be pushed into the lower receptacle of the stabilizing device in a direction extending parallel to the stabilizing device. The door leaf segment can then be threaded into a guide device of the rolling door and the lower edge of the door leaf segment can then be connected to a stabilizing device arranged underneath by the lower edge of the door leaf segment first being placed against a bounding surface of the first receptacle part of the stabilizing device that delimits the mouth and then the second receptacle part being fastened to the first receptacle part in a direction extending perpendicular to the plane of the door leaf in order to form the receptacle for the lower edge region of the door leaf segment.

With regard to a possibly desired sealing function, it can be expedient if a sealing material is accommodated in at least one receptacle, preferably an upper receptacle of the stabilizing device, preferably in the region of the base of this receptacle. Additionally or alternatively, the sealing material can also be provided between the extension in the edge region of a door leaf segment and the mouth of the receptacle. With this arrangement, damping can be achieved in the course of the door leaf movement if the extension hits an edge of the opening. In this way, a slight tension can also be achieved between the stabilizing device and the door leaf segment, which is able to compensate for slight tolerances. A sealing material arranged between the extension and the mouth can hold the pane tightly in position and reduce or completely prevent any possible noise development when the door leaf segment moves relative to the stabilizing device. A corresponding sealing material can be placed in the receptacle of the stabilizing device or attached directly to the extension of the door leaf segment. This can be a sealing material that swells when moisture penetrates. Since in the region of the lower receptacles in the closed position hardly any moisture can penetrate into the receptacles, no sealing material is regularly required in these receptacles. As can be seen from the above explanations, the present invention is used with particular advantage in such doors in which at least one segment including a floating-mounted edge portion includes at least one pane which is formed at least in portions of a flexible and/or transparent material such as polycarbonate.

In terms of improving thermal protection, it has proven to be particularly advantageous if at least one door leaf segment including a floating-mounted edge region includes at least two panes spaced apart from one another in the door leaf thickness direction and extending approximately parallel to one another, of which at least one includes an edge region held on the stabilizing device and facing toward an adjacent door leaf segment, wherein at least one edge region of at least one pane is held floating on the stabilizing device in such a way that a relative movement of this edge region with respect to the stabilizing device is possible at least in the door leaf movement direction. This edge region can be held on the stabilizing device in a manner similar to that already described above. In this context, it has proven to be particularly advantageous if at least one stabilizing device includes two receptacles spaced apart from one another in the door leaf thickness direction, each for receiving an edge region of a pane of a door leaf segment.

In the embodiment of the invention just described, the panes of a door leaf segment are spaced apart radially from one another in the open position. They are moved into the open position along tracks that are radially spaced apart from one another and correspondingly deform differently. As a result, when the door leaf is moved into the open position, a brief collision may occur if the edge regions of the panes are designed identically and are received in identical receptacles of the stabilizing device. To remedy this deficiency, a particularly preferred embodiment of the invention provides that at least one edge region of the inner (outer) pane in the roll facing toward (away from) the roll axis is held with greater play in relation to the stabilizing device than the corresponding edge region of the outer (inner) pane facing away from (toward) the roll axis. For this purpose, the distance between the mouth of the receptacle for the edge region of the radially inner (outer) pane and the bottom of this receptacle in the door leaf movement direction can be greater than the corresponding distance of the receptacle for the edge region of the radially outer (inner) pane. In this way, a possible track difference (relative movement) can be compensated for by the different tracks of the individual panes.

The double pane arrangement described creates an air cushion. The resulting chamber can be closed in the region of the edges of the panes extending parallel to the door leaf movement direction. For this purpose, a filling material, which in one preferred embodiment of the invention can be made of a yielding material, such as an elastic muntin, can be provided in the region of at least one of the edges of at least one segment extending parallel to the door leaf movement direction, preferably between delimiting surfaces of the panes facing toward one another. Elastic pads, such as foams, can be used as filling material, which are glued in or fixed mechanically. The filling material also enables the necessary mobility when moving the door leaf into the open position and out of the open position. Additionally or alternatively, fan-like plastic elements can also be used as filling material, which are connected to one another like a hinge and can be clipped onto a pane.

The use of elastic pads or elastic compartment elements in door leaf segments with only one pane is also considered within the scope of the invention, in order to compensate for the offset between the pane and the reinforcement profile in the edge region. As a result, a seal can be implemented to the side part of the door. Since the door leaf segments of a door according to the invention are usually made transparent, at least in portions, it is particularly preferred within the scope of the invention if the filling material extends over 50% or less, in particular 20% or less, of the door leaf width in a direction extending parallel to the stabilizing devices, so that the transparency of the door leaf segments is only slightly impaired.

In terms of a desired thermal separation between door leaf inside (interior) and door leaf outside (exterior) it has proven to be particularly useful if at least one stabilizing device has at least two stabilizing elements that are spaced apart from one another in the door leaf thickness direction and are connected to one another via a connecting element made of thermally insulating material. Thus, when using stabilizing elements having sufficient strength, such as stabilizing elements made of steel or aluminum, satisfactory stabilization can be achieved without impairing the thermal separation.

In order to provide a door that enables high door running speeds, joint assemblies for guiding the door leaf movement are preferably provided in the region of the lateral edges of the door leaf, which in the closed position run at least in portions in the direction of gravity, and are fastened on the door leaf and can interact with corresponding fixed guide devices, such as guide rails, wherein each of the joint assemblies includes a plurality of joint members connected to one another with respect to joint axes extending perpendicular to the movement direction with the lateral edges of the door leaf, so that the door leaf is connected via the stabilizing devices to the joint assemblies. In this respect, the structure of doors according to the invention corresponds to the structure of the doors described, for example, in WO 2018/219512 A1. The content of the disclosure of this document with regard to the design of the joint assemblies and the guide rail as well as the coupling of the stabilizing devices to the joint assemblies is included in this description by express reference.

Corresponding to the known doors, at least one segment made of flexible material can also be arranged between two stabilizing devices in the case of rolling doors according to the invention, wherein a lateral edge of the segment extending approximately perpendicular to the stabilizing devices and the joint axes and approximately parallel to the joint assemblies and the door leaf movement direction can extend over two, three, or more joint members and at least one edge region of the segment can be held floating on a stabilizing device.

According to WO 2018/219512 A1, at least one stabilizing device can extend approximately parallel to a joint axis and be connected along this joint axis to at least two, preferably at least two, joint assemblies provided on mutually opposite lateral door leaf edges. To increase the overall stability of the arrangement, at least one reinforcement strip can be provided which extends approximately parallel to the lateral door leaf edge or the door leaf movement direction and is fastened to the door leaf. Similarly to the doors according to WO 2018/219512 A1, at least one possibly oval-spiral guide track can be provided to guide the door leaf movement and to determine the open position of the door leaf, wherein at least one joint member on its side facing away from the door leaf can include a guide assembly working together with the guide track to guide the door leaf movement, which preferably comprises at least one guide roller which is rotatably mounted with respect to a roller axis extending parallel to the joint axes and which is preferably accommodated in a guide track at least in the open position of the door leaf.

With regard to a simple adaptation of the structure of the door leaf of a rolling door according to the invention, it has proven to be particularly expedient if a stabilizing device extending parallel to a joint axis is only connected to the joint assemblies. This embodiment of the invention makes it possible to design the stabilization of the door leaf variably while the design of the individual door leaf segments or panes remains the same if the stabilizing device connected only to the joint assemblies can be attached to the joint assemblies independently of the dimensions of the individual door leaf segments. It is not fastened on the door leaf segments or panes. The attachment of this additional stabilizing device therefore does not require any adjustment of the geometry of the door leaf segments or panes. The variability of the attachment of this stabilizing device is only limited by the division of the joint members of the joint assembly.

If additional collision protection is to be provided for rolling doors according to the invention, the stabilizing device connected only to the joint assemblies can be arranged between the lower stabilizing devices and those connected to the panes of the rolling door. Within the scope of the invention, however, it has proven to be particularly expedient if the stabilizing device not connected to the door leaf segments is arranged between the two upper stabilizing devices connected to the segments. In this way, a seal adapted to the height of the wall opening can be implemented in the lintel region of the wall opening without having to change the geometry of the door leaf segments and the other components of the rolling door according to the invention.

In this context, it has proven to be particularly expedient if the stabilizing device, which is only connected to the joint assemblies but not to the door leaf segments, includes a sealing arrangement that can be placed against a lintel of the wall opening on its side facing away from the adjacent door leaf segment and/or on its side facing toward the segment includes at least one sealing strip which extends approximately parallel to the hinge axes, preferably over essentially the entire width of the door, and can be placed against the adjacent segment.

According to a particularly preferred embodiment of the invention, the leading edge of the door leaf during an opening movement can be formed by a leading stabilizing device which is connected in a rotationally-fixed manner to an upper edge of a segment made of a flexible material in the closed position and which is connected in a rotationally-fixed manner to a guide assembly. This arrangement prevents the door leaf segment from bulging out undesirably, as explained in detail in WO 2018/219512.

In order to obtain a tight guide seal, it has proven to be expedient if at least one joint member of a joint assembly is assigned a sealing assembly that can be placed against a bounding surface, in particular the inner bounding surface, of the door leaf in the closed position, as explained in detail in WO 2018/219512. Furthermore, within the scope of this invention, a pretensioning device that can be coupled in the course of the opening movement to a trailing edge of the door leaf during an opening movement and can be pretensioned in the course of the opening movement can also be provided for braking the opening movement and for providing a pretensioning force that displaces the door leaf from the open position into the closed position.

As can be seen from the above explanation, a door according to the invention expediently includes a guide device for guiding the door leaf movement between the open position and the closed position. The invention is used with particular advantage in such doors that allow a high door speed. For this purpose, the guide device can enable contactless magnetic guidance. For this purpose, the guide device can include a magnetic field generating device on the door leaf side and a magnetic field generating device that is fixed with respect to the wall opening, wherein the magnetic field generating devices are designed to obtain contactless guidance of the door leaf movement along at least one portion of the specified track in the region of at least one of the mutually opposite lateral edges.

Corresponding guide assemblies are described in PCT/EP2019/058221. The disclosure content of this document with regard to the guide devices and the magnetic field generating assemblies is hereby incorporated into this description by express reference. In this context, it is of particular importance that the guide assembly includes at least one guide web which is fixed with respect to the wall opening and extends along a portion of the specified track, having two outer bounding surfaces and at least two guide devices fastened to the door leaf, wherein a first outer bounding surface of the guide web a forms a guide surface for a first guide device and a second outer bounding surface of the guide web forms a second guide surface for a guide device, so that the guide web is received between the guide devices attached to the door leaf. Alternatively or additionally to the magnetic field generating devices, at least one guide device can include a guide roller which is rotatably mounted with respect to a roller axis extending perpendicular to the specified track and approximately parallel to the door leaf in the closed position, which rolls on a guide surface of the door leaf when the door leaf moves.

If contactless guidance of the door leaf movement with the aid of magnetic field generating devices is used, at least one magnetic field generating device, preferably at least one magnetic field generating device on the door leaf, can include at least one permanent magnet. The magnetic field generating device on the door leaf can expediently include two permanent magnets which are arranged on opposite sides of the guide web and are fixed to a common carrier which engages over an edge of the guide web on the door leaf. Further details of the magnetic field generating devices are explained in PCT/EP2019/058221, the content of the disclosure of which, also with regard to the magnetic field generating devices, is hereby incorporated into this description by express reference.

According to a further aspect, the invention relates to a method for producing a segmented pane for a rolling door according to the invention, which is essentially characterized in that a plastic web and/or board preferably consisting at least partially of polycarbonate is conveyed along a conveying direction, in particular is drawn off in a conveying direction continuously from one decoiler, or a winding or coil, at least one edge of the plastic web extending parallel to the conveying direction is bent over, if necessary with the aid of a roll former, and then a pane is severed from the plastic web along a separating line extending approximately perpendicular to the conveying direction. Thus, the panes for rolling doors according to the invention can be produced in a continuous manufacturing process. The roll former can be a double-head profiling system, for example. The plastic web can be delivered wound up in a spiral on a decoiler reel and supplied to the manufacturing process and/or delivered in the form of rectangular blanks and supplied to the manufacturing process.

BRIEF DESCRIPTION OF THE DRAWINGS

The invention is explained below with reference to the drawing, to which express reference is made with regard to all details that are essential to the invention and not specifically highlighted in the description. In the drawing.

DETAILED DESCRIPTION

Figure 1:
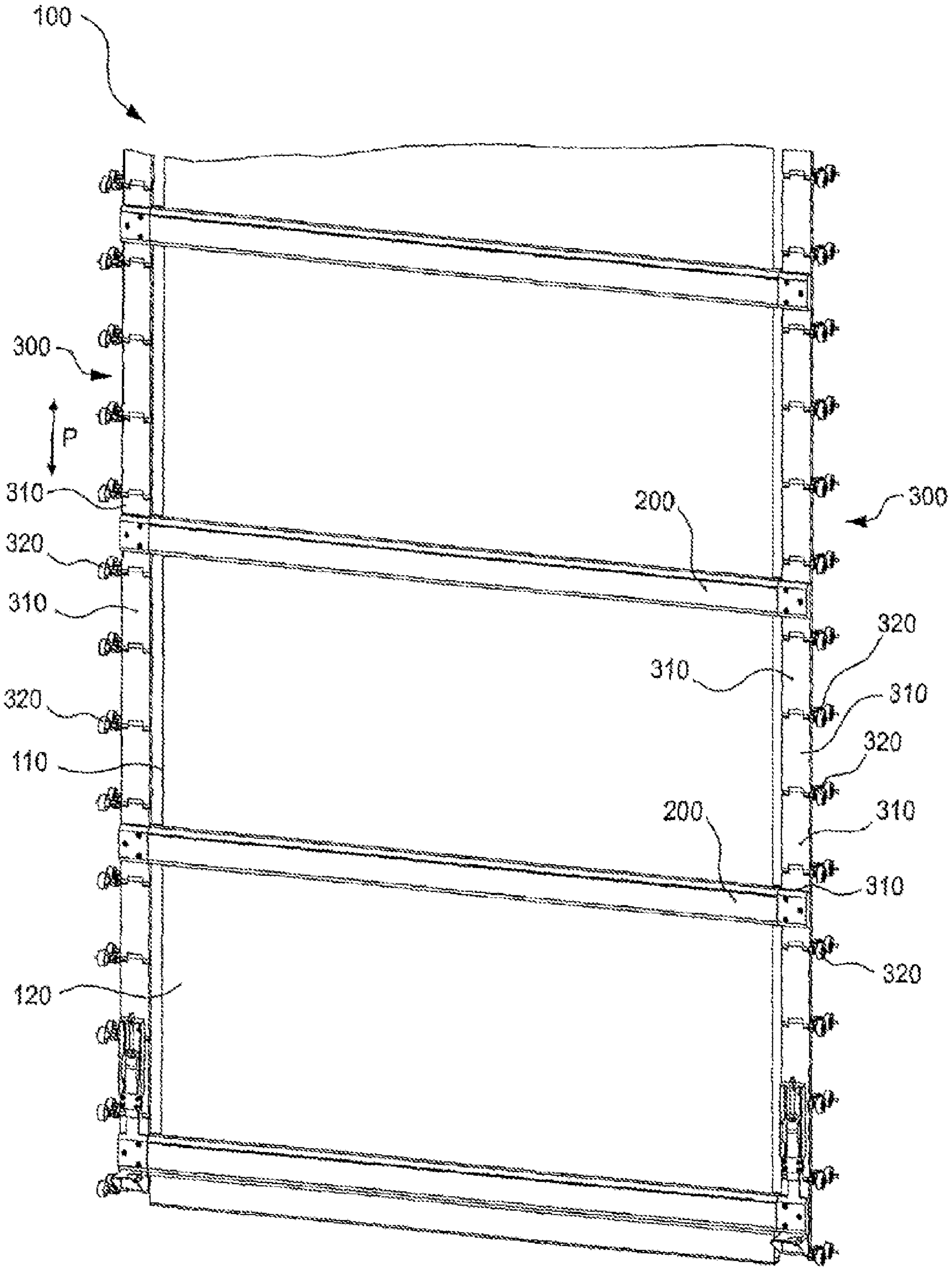
FIG. 1 shows a schematic representation of a lateral edge region of a rolling door according to the invention.

FIG. 1 shows two door leaf segments 110 and 120 of a door leaf 100 of a door according to the invention, arranged one behind the other in the door leaf movement direction indicated by the double arrow P. The door leaf segments consist at least partially of a flexible material and form bending regions of the door leaf. At least one door leaf segment, preferably each door leaf segment, can be provided with a functional film on at least part of its outer bounding surface. A stabilizing device designed as a stabilizing profile 200 is arranged between the door leaf segments 110 and 120. The stabilizing profile 200 extends in a direction perpendicular to the door leaf movement direction P, approximately in the plane of the door leaf. A lower edge of the upper door leaf segment 120 that is provided with a functional film is held floating in the region of an upper receptacle 230 (cf. FIG. 2) of the stabilizing profile 200, while an upper edge of the lower door leaf segment 110 that is also provided with a functional film is held floating in a lower receptacle 240 (cf. FIG. 2) of the stabilizing profile 200. An upper edge of the door leaf segment 120 is held on a further stabilizing profile 200, just as a lower edge of the door leaf segment 110 is also held on a lower stabilizing profile 200.

The stabilizing profiles 200 are fastened to a joint assembly 300 which extends approximately parallel to the door leaf movement direction or parallel to a lateral edge of the door leaf 100. The joint assembly 300 comprises a plurality of joint members 310 which are arranged one behind the other in the door leaf movement direction and are connected to one another in an articulated manner with respect to joint axes extending perpendicular to the door leaf movement direction. In this case, three joint members 310 are arranged between each two adjacent stabilizing profiles 200. In other embodiments of the invention, only one or two or four or more joint members can also be provided between the stabilizing profiles 200. A stabilizing profile can also be provided in the region of each connection between successive joint members.

On its side facing away from the door leaf segments 110 and 120, the joint assembly has guide rollers 320, which are rotatably mounted with respect to roller axes extending parallel to the joint axes. The guide rollers 320 are each arranged in pairs in the region of a joint axis in such a way that they can receive a guide web between them and can roll on mutually opposite bounding surfaces of the guide web in order to enable the door leaf movement to be guided, as described in PCT/EP2019/058221.

Figure 2:
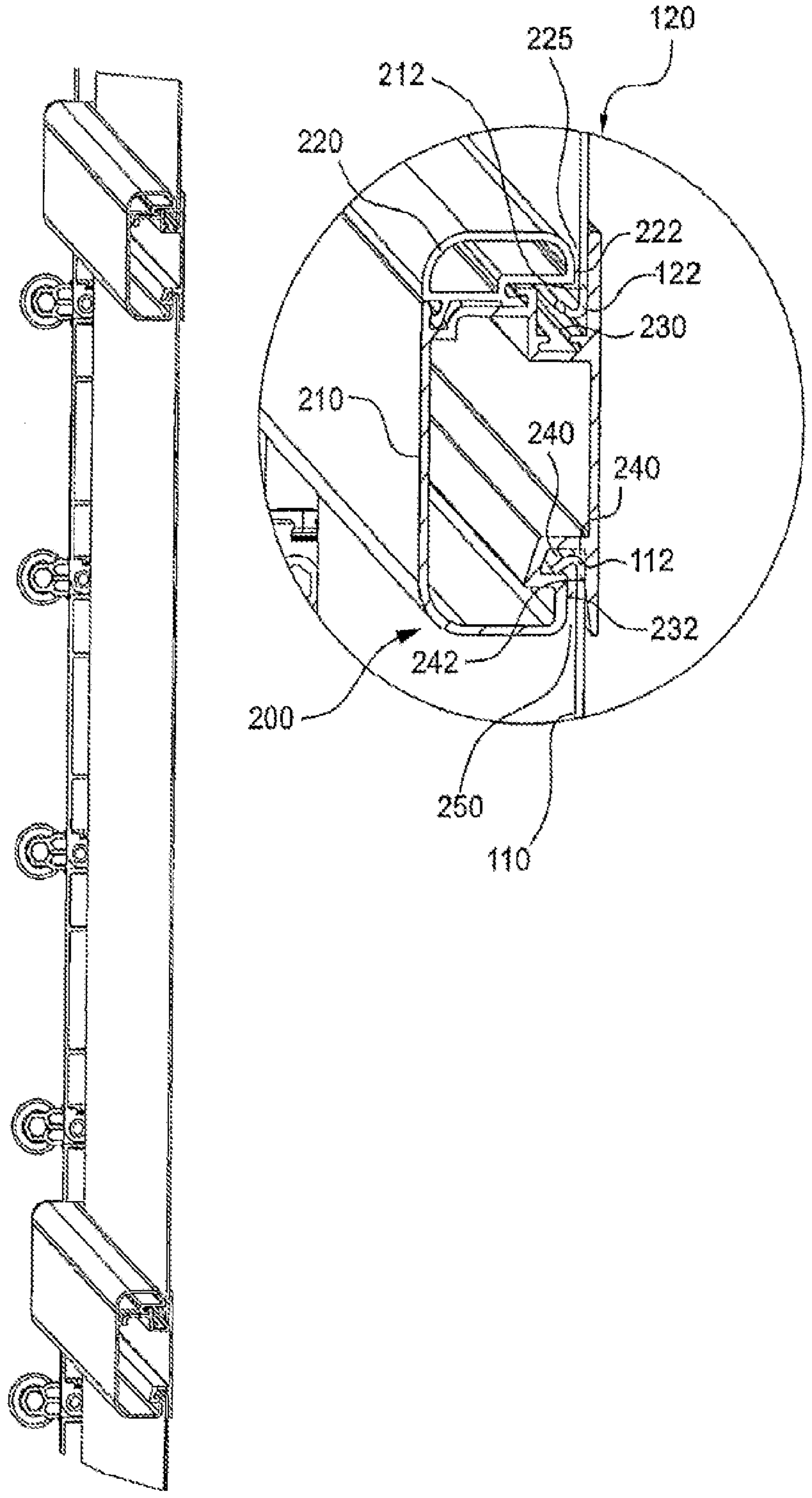
FIG. 2 shows a detailed representation of the transition between door leaf segments and a stabilizing device, which is designated by A in FIG. 1.

As can be seen particularly clearly in FIG. 2, an upper edge region 112 of the door leaf segment 110 extending parallel to the hinge axes and parallel to the stabilizing profile 200 is arranged in a receptacle 240 of the stabilizing profile 200. The upper edge 112 of the door leaf segment 110 is formed by bending over the upper edge of the door leaf segment 112 onto itself as an extension in a plane perpendicular to the door leaf plane defined by the door leaf movement direction P and the stabilizing profile 200. Starting from the extension 112, the door leaf segment 110 extends downwards with a transition region through a mouth 250 of the stabilizing profile 200 and is exposed outside the mouth 250, as can be seen in FIG. 1. The door leaf segment 120 also includes an extension 122 received in a receptacle 230 of the stabilizing profile 200. Starting from the extension 122, the door leaf segment 120 extends upwards through a mouth 225 with a transition region and is exposed outside the mouth 225.

The mouth 250 is delimited by bounding surfaces 232 and 242, the distance of which from one another in a direction parallel to the door leaf thickness direction is less than the thickness of the extension 112, but greater than the thickness of the transition region of the door leaf segment 110 between the extension 112 and the exposed region outside of the stabilizing profile 200. The mouth 225 is also delimited by bounding surfaces 212 and 222, the distance between which in the door leaf thickness direction is less than the thickness of the extension 122, but greater than the thickness of a transition region between the extension 122 and the region of the door leaf segment 120 that is exposed outside of the stabilizing profile 200.

As can also be seen in FIG. 2, the stabilizing profile 200 is made in two parts from two parts 210 and 220 which are detachably connected to one another. The recess 240 at the lower edge of the stabilizing profile 200 is formed entirely by the first stabilizing profile part 210, while the receptacle 230 at the upper edge of the stabilizing profile 200 is formed by the two stabilizing profile parts 210 and 220. A first bounding surface 212 of the mouth 225 is formed by the first stabilizing profile part 210, while a second bounding surface 222 of the receptacle 230 is formed by the second stabilizing profile part 220.

To install a rolling door of the type shown in the drawing, an upper edge of a door leaf segment can be pushed into the receptacle 240 in a direction extending parallel to the stabilizing profile 200, wherein a transition region between the extension 240 and an region of the door leaf segment that is exposed outside of the stabilizing profile 200 penetrates the mouth 250. The module prepared in this way can be threaded into a guide device, which can consist of a guide web arranged between the guide rollers 320. A lower edge 122 of the door leaf segment can then be placed against a bounding surface 212 of the first stabilizing profile part 210 and the second stabilizing profile 220 can be clipped onto the first stabilizing profile 210 to form the mouth 225, which is penetrated by the transition region between an extension of the door leaf segment received in the receptacle 230 and an region of the door leaf segment that is exposed outside of the stabilizing profile 200.

The distance between the mutually opposite bounding surfaces 212 and 222 or 232 and 242 of the mouths 225 or 250 is greater than the thickness of the transitional regions penetrating these mouths. This prevents a clamping effect in the region of the transition regions.

Furthermore, the distance between the mouth 225 or 250 and the bottoms of the receptacles 230 and 240 opposite to the corresponding mouths 225 or 250 is greater than the length of the extensions 122 or 112 in the door leaf movement direction. This enables a relative movement of the door leaf segments 110 and 120 with respect to the stabilizing profile 200.

A sealing material can be arranged in the region of the bottom of the receptacle 230, which possibly swells if moisture penetrates.

Figure 3:
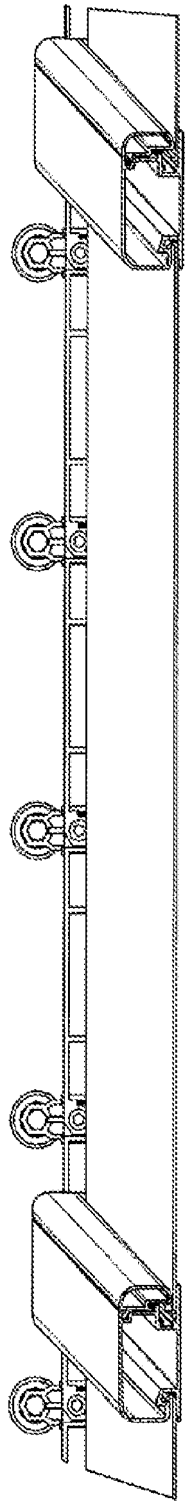
FIG. 3 shows a detailed representation corresponding to FIG. 2 according to a further embodiment of the invention.
Figure 3:
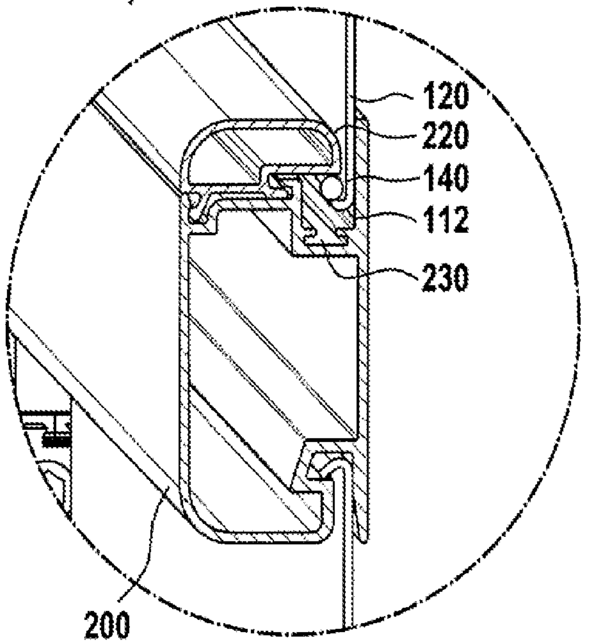

The embodiment of the invention shown in FIG. 3 differs essentially from the embodiment explained with reference to FIG. 2 in that a damping element 230 is arranged between the bent-over lower edge of the pane 120 forming the extension 122 and the lower bounding surface of the part 220 of the stabilizing profile 200, which, on the one hand, causes a sealing of the pane 120 floating in the stabilizing profile 200, and, on the other hand, provides a pre-tension of the pane 120 mounted floating in the stabilizing profile 200, which helps to compensate for tolerances and holds the pane 120 tautly in its position. Furthermore, the damping element 140 reduces noise development, which can occur when the bent-over lower edge of the pane 120 is moved in the receptacle 230 and strikes against the lower bounding surface of the part 220 of the stabilizing profile.

Figure 4:
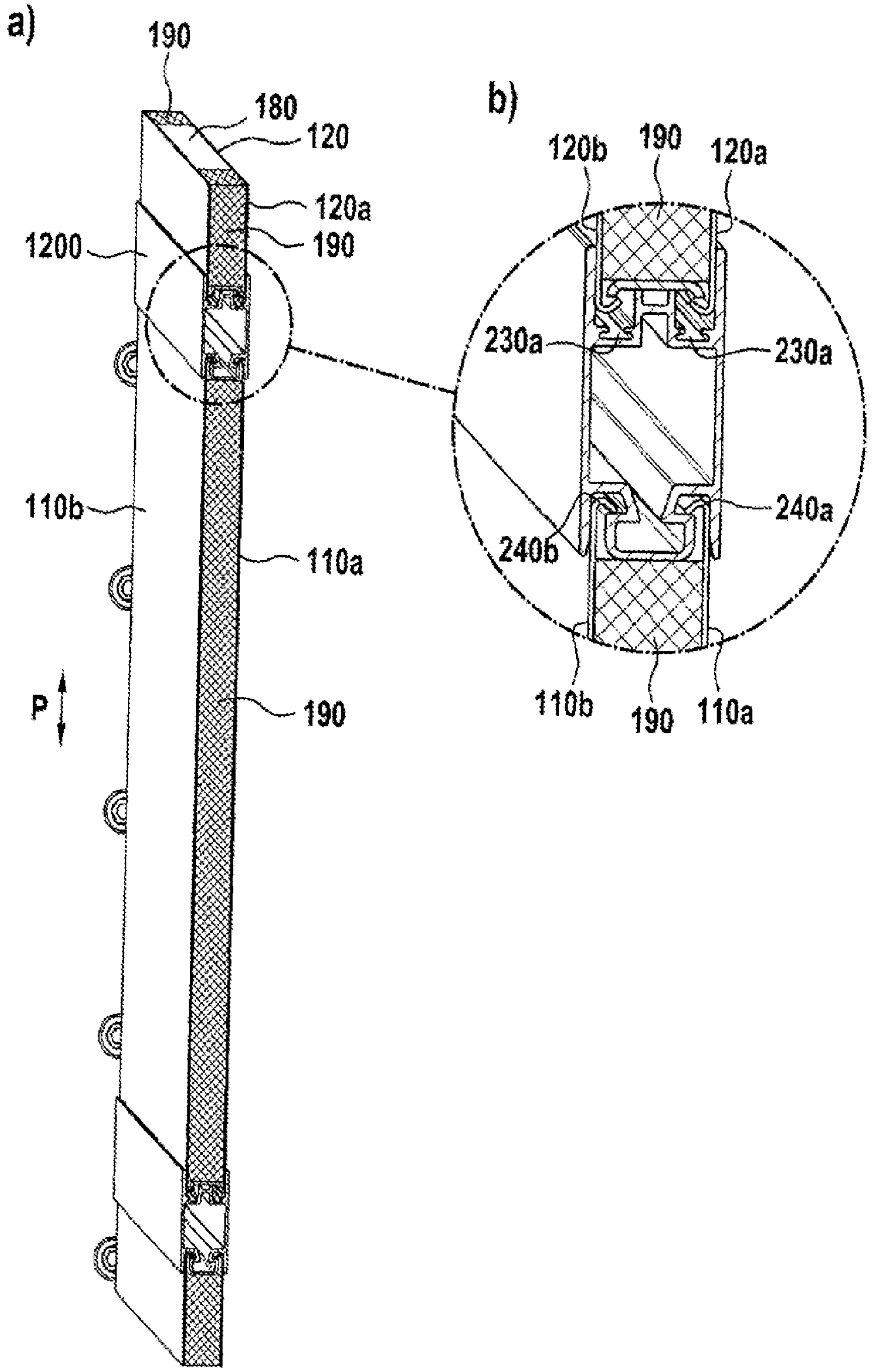
FIG. 4 shows a schematic representation of a lateral edge region of a rolling door according to the invention according to a second embodiment of the invention.

The embodiment of the invention shown in FIG. 4 differs essentially from the embodiment of the invention shown in FIGS. 1 and 2 in that the door leaf segments include two panes 120*a* and 120*b* or 110*a* and 110*b* extending essentially parallel to one another, which are each designed as flexible polycarbonate panes. The lower edges of the panes 120*a* and

120*b* are each provided with an extension formed by bending over these edges, which are mounted floating in receptacles 230*a* and 230*b* of the stabilizing profile 1200. The upper edges of the panes 110*a* and 110*b* of the lower segment are held in receptacles 240*a* and 240*b* of the stabilizing profile 1200. An air cushion 180 promoting heat protection is formed between the panes 120*a* and 120*b* or 110*a* and 110*b*. The air cushion 180 is closed at the edges extending parallel to the movement direction P of the segments 120 and 110 by elastic cushions 190 provided between the panes 120*a* and 120*b* or 110*a* and 110*b*. These cushions 190 can be designed as elastic muntins. For example, elastic pads made of a foam-like material can be used, which are glued in or fixed mechanically. The elastic design of the cushions 190 also enables the necessary mobility when winding the door leaf into the spiral-shaped guide track when the open position is reached.

Additionally or alternatively, fan-like plastic elements, which are connected to one another like a hinge, can also be clipped onto the pane in the chamber 180. The use of corresponding elastic pads or elastic compartment elements in door leaf segments with only one pane, as shown in FIGS. 1 and 2, is also considered in order to compensate for the offset between the pane and the stabilizing profile in the wall region. As a result, the sealing of the door leaf can be improved in the closed position.

Figure 5:
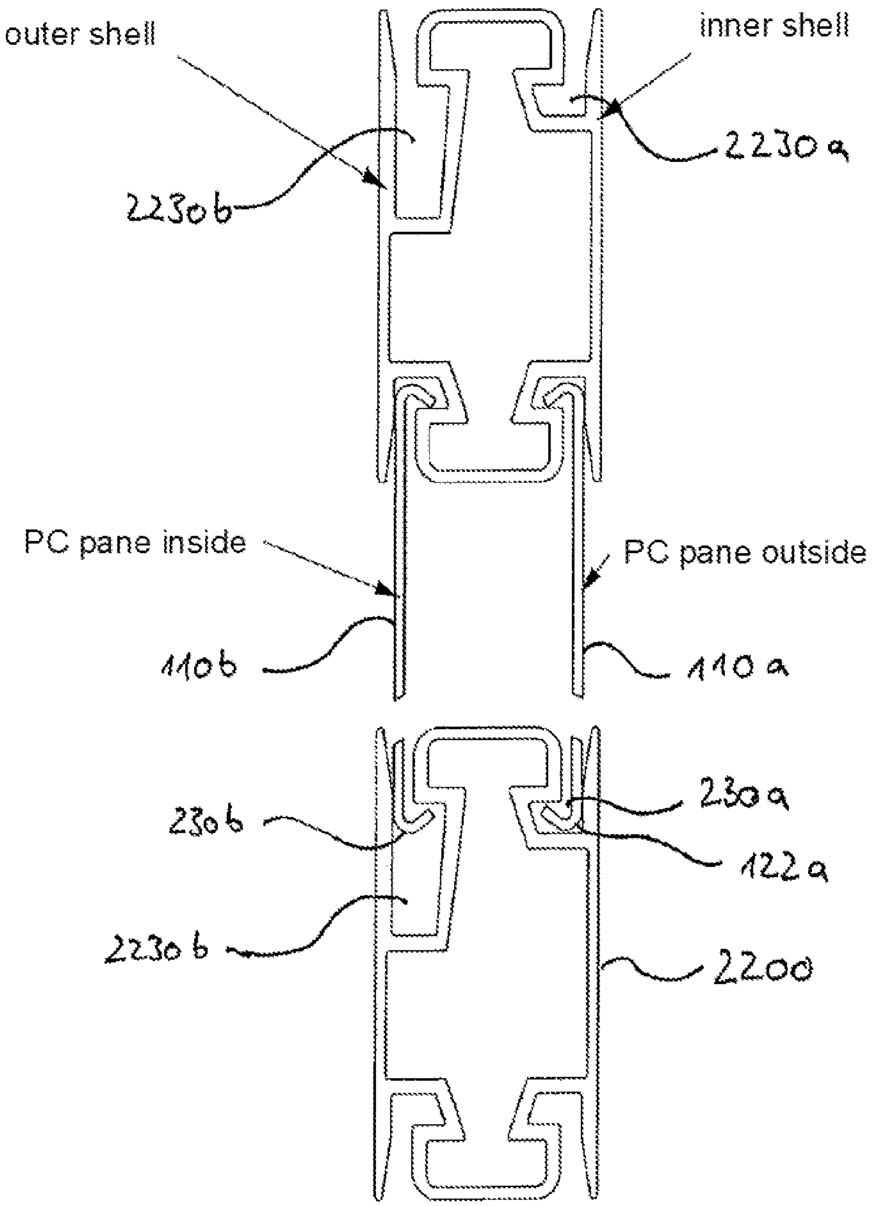
FIG. 5 shows a schematic representation of a rolling door according to the invention according to a third embodiment of the invention.
Figure 5B:
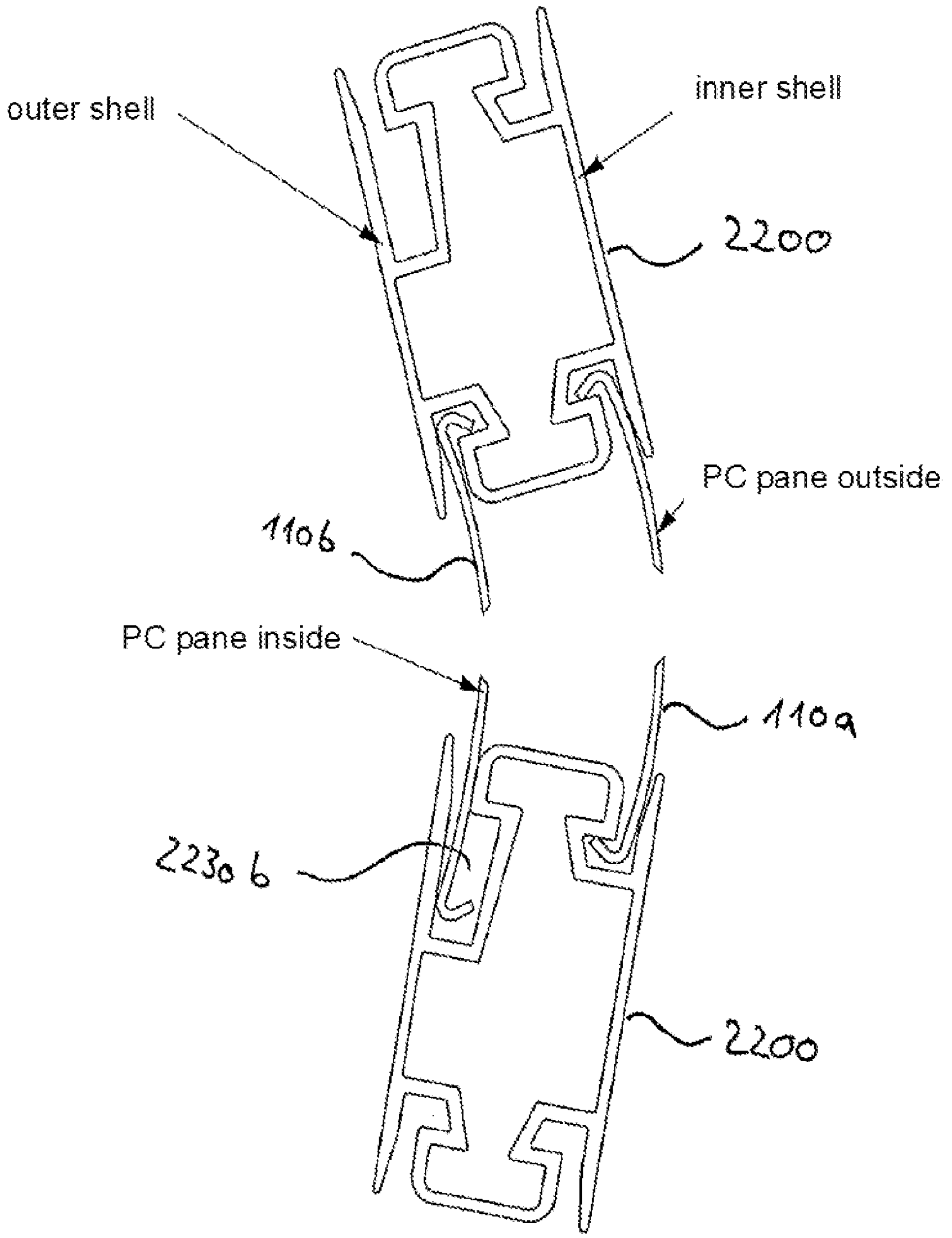

The embodiment of the invention shown in FIG. 5 differs essentially from the embodiment explained with reference to FIG. 4 in that the chamber 2230*b* of the stabilizing profile 2200, which is used to receive the extension 230*b* at the lower edge of the pane 110*b*, has a greater depth in the door leaf movement direction than the chamber 230*a* which is used to receive the extension 122*a* formed at the lower edge of the pane 110*a*. As a result, the pane 110*b* lying radially on the inside in the open position is mounted with greater play in the receptacle 230*b* than the pane 110*a* lying radially on the outside in the open position. As a result, the different deformation of the panes 110*a* and 110*b* when the door leaf has reached the open position can be compensated for, as illustrated in FIG. 5*b*.

Figure 6:
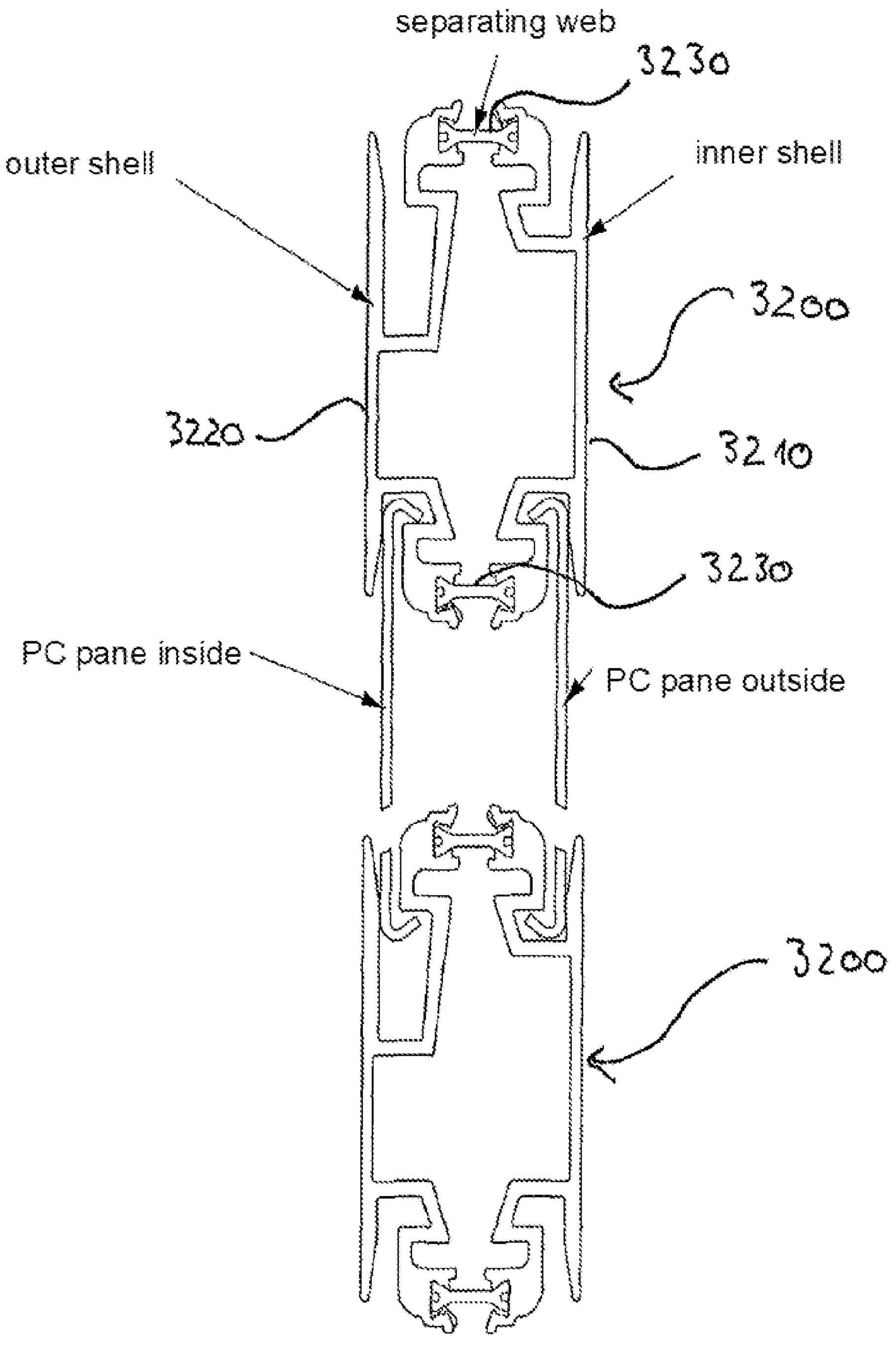
FIG. 6 shows a schematic representation of a rolling door according to the invention according to a fourth embodiment of the invention.

The embodiment of the invention shown in FIG. 6 differs essentially from the embodiment of the invention explained with reference to FIG. 5 in that the stabilizing profiles 3200 are made in three parts overall, wherein the parts 3210, 3220, 3230 are made in succession in the door leaf thickness direction. The part 3210 lying on the inside when the door leaf is in the closed position, like the part 3220 of the stabilizing profile 3200 lying on the outside in the closed position, is made of a metallic material. This gives the stabilizing profile the necessary stability. The parts 3210 and 3220 are connected to each other via connecting elements 3230 made of thermally insulating material such as plastic. Thus, while ensuring sufficient overall stability of the stabilizing profiles 3200, a heat loss between the interior and the exterior via the stabilizing profiles 3200 can be effectively reduced.

Figure 7:
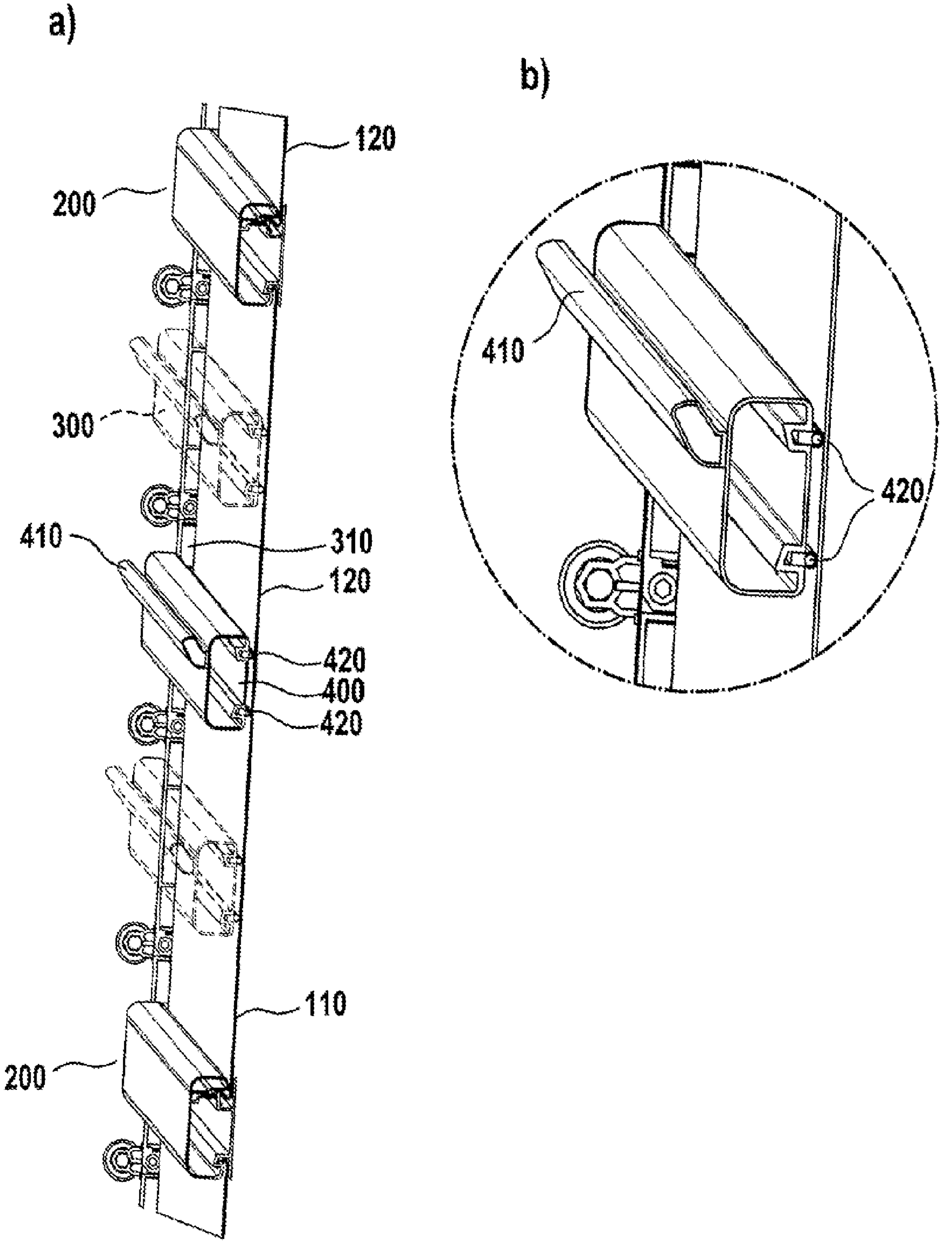
FIG. 7 shows a schematic representation of a rolling door according to the invention according to a fifth embodiment of the invention.

The embodiment of the invention shown in FIG. 7 differs essentially from the embodiment of the invention shown in FIGS. 1 and 2 in that a stabilizing profile 400 is provided between the stabilizing profiles 200 fixed to the lower and upper edges of the panes 110, 120, which is fastened solely on the joint members of joint assembly 300. This additional stabilizing profile 400 can be positioned independently of the pane geometry and attached to position a lintel seal depending on the height of the wall opening. For this purpose, the stabilizing profile 400 is provided with a sealing element 410 on its side facing away from the panes 110, 120, while it is embodied having hose seals 420 on the side facing toward the pane 120, which press against the pane 120. Since the additional stabilizing profile 400 is not fastened on the pane 120, it can be attached to any joint members 310 independently of the pane geometry. The position of the seal 410 can thus be adjusted to the height of the wall opening. This not only improves the sealing effect, but also increases the overall stability of the rolling door.

Figure 8:
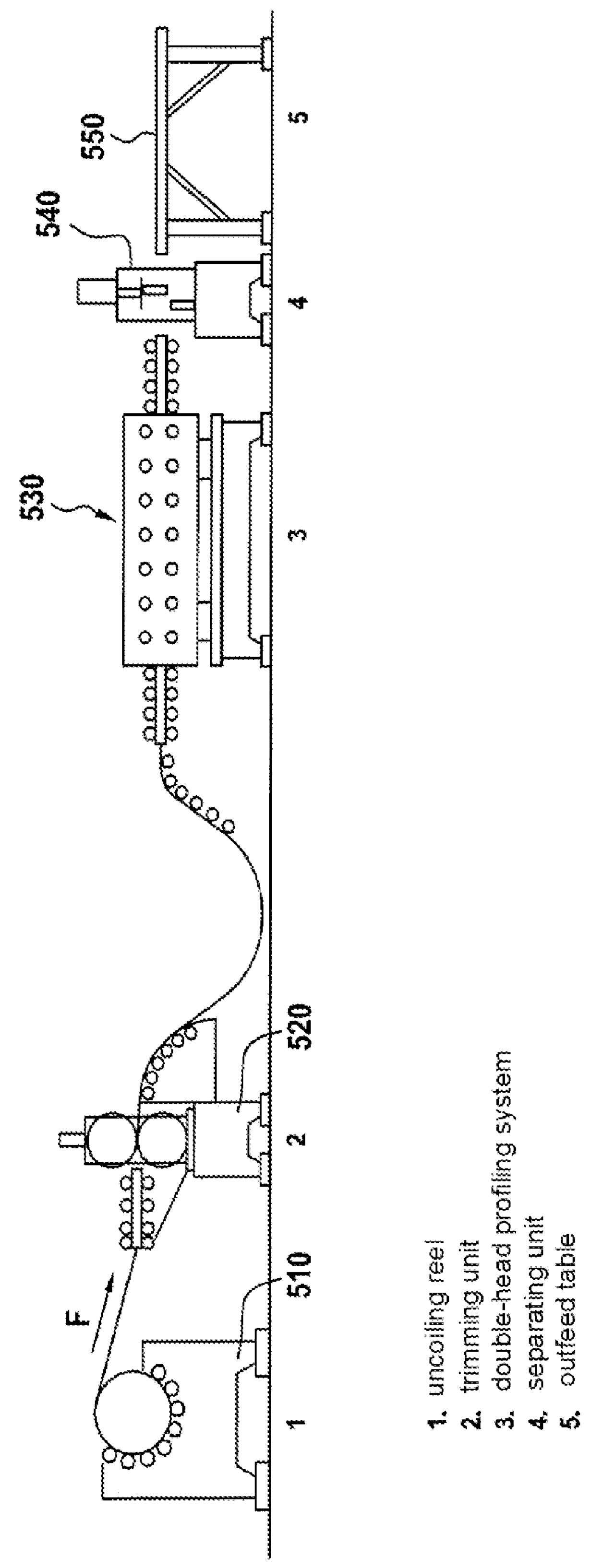
FIG. 8 shows a schematic representation of a production plant for the panes of a rolling door according to the invention.

In FIG. 8, a plant for the production of panes for the door leaf segments of rolling doors according to the invention is shown schematically. When using the plant shown in FIG. 8, a plastic web consisting at least partially of polycarbonate is continuously unwound as coil goods from an unwinding reel 510 in a conveying direction F. A functional film is laminated onto the plastic film using a laminator that is not shown in the drawing. The plastic web runs through a trimming unit 520, in which the exact width of the plastic web is set, and then a double-head profiling system 530, in which the edges of the plastic web extending parallel to the conveying direction F are bent over to create the extension of the panes. As can be seen in FIG. 8, the profiling system has a large number of shaping rollers, using which the edges of the material web are bent over step by step. After leaving the double-head profiling systems 530, panes of a predetermined length are cut off the material web with the aid of a separating unit 540 along a separating line extending perpendicularly to the conveying direction F and placed on an outfeed table 550. The following features of methods according to the invention are of particular importance in the scope of this invention. They can be essential to the invention individually or in combination with one another:

- The plastic web is produced by extrusion and wound up into a coil or roll. The width of the plastic web or the coil width results from the size of the extruder.
- The width of the extruded plastic sheet, such as an extruded polycarbonate sheet, will vary. Using a trimming station, the material web can be precisely trimmed to the desired width, preferably before it enters the forming station.
- In the trimming station, a wider plastic web can be split to a narrower size. This allows the required pane size to be set depending on the door size.
- A plastic web, in particular a polycarbonate web, can have significantly higher restoring forces than steel after passing through a forming device, which may be designed as a double-head profiling system. Therefore, when the method according to the invention is carried out, there is preferably a significant overbending in order to ultimately obtain the desired contour. It is also taken into consideration that the deformation can continue to revert over time and that the deformed state can only slowly leave the shape obtained after leaving the deformation station under the influence of the restoring forces.
- To reduce the restoring forces, it has proven useful to assist the forming process with heat. When using polycarbonate webs, the webs are expediently heated to a temperature of between 150 and 170 degrees Celsius, at least in the forming region. This achieves the following effects:
  1. There is gentler forming with less stress on the polycarbonate and thus avoidance of crack formation in the forming region.
  2. The forming stresses are neutralized and the restoring forces are minimized.
- Plastic, in particular polycarbonate, has less inherent stability than steel. It has therefore proven to be particularly expedient within the scope of the invention if the plastic web is supported between the edges extending parallel to the conveying direction, in the region of which the individual forming stages can also be arranged. The plastic sheet can be supported between the edges by means of at least one belt conveyor. Using the belt conveyor, the plastic web is supported between the edges extending parallel to the conveying direction and conveyed in the conveying direction. It has proven to be particularly expedient if the plastic web is held from above and from below with the aid of suitable conveyors, in order to ensure stability for a continuous shaping process.

Instead of belt conveyors, other conveyor devices or support devices suitable for supporting the plastic web can also be used.

The invention is not limited to the exemplary embodiment explained on the basis of the drawing. For example, the extensions in the region of the edges of the door leaf segments can also be formed by a welt that is glued or welded on. The stabilizing profiles 200 can be made in one piece overall, so that the extended edges of the door leaf segments have to be pushed into the stabilizing profiles laterally. Instead of a guide assembly in which two guide rollers press against mutually opposite bounding surfaces of a guide web, guide assemblies can also be used in which guide rollers are received in a guide rail. Instead of guiding by means of guide rollers, a contactless magnetic guide can also be used.

The functional films used according to the invention can also include so-called low-E films having a high degree of reflection. As a result, good thermal insulation can be achieved with a comparatively small pane thickness. Of course, the stabilizing devices of the doors according to the invention can also be covered with film in order to enable a uniform door leaf design.

The invention claimed is:

1. A door comprising:

a door leaf that can be moved along a track including a deflecting portion between an open position, in which the door leaf at least partially opens a wall opening, and a closed position, in which the door leaf at least partially closes the wall opening;

the door leaf having a bending region that is deformable when the door leaf moves along the deflecting portion and which is made of a flexible base material;

wherein a functional film is laminated onto at least one part of at least one bounding surface of the bending region, wherein the door leaf includes a plurality of door leaf segments arranged one behind the other in a movement direction of the door leaf, wherein a stabilizing device extending perpendicularly to the door leaf movement direction is arranged between two adjacent door leaf segments of said plurality of door leaf segments, and at least one of the two adjacent door leaf segments comprises said bending region, wherein a first edge region of a first door leaf segment of said plurality of door leaf segments and second edge region of another, second door leaf segment of said plurality of door leaf segments are held on the stabilizing device, and at least one of said first and second edge regions is a floatingly held edge region that is held floating on the stabilizing device in such a way that a relative movement of said floatingly held edge region with respect to the stabilizing device is possible at least in the door leaf movement direction.

2. The door of claim 1, wherein a bounding surface of the functional film facing away from the base material has a higher scratch resistance according to DIN EN ISO 12137 than the base material.

3. The door of claim 1, wherein the functional film is mixed with coloring pigments.

4. The door of claim 1, a bounding surface of the functional film facing away from the base material is at least partially mirrored or is designed with a decoration.

5. The door of claim 1, wherein the functional film has a thickness of 0.2 millimeters (mm) or less.

6. The door of claim 1, wherein the functional film is laminated onto the base material by means of an adhesive.

7. The door of claim 1, wherein the functional film includes a polyvinyl chloride (PVC) layer.

8. The door of claim 1, wherein the functional film includes a first clear outer layer comprising polyethylene terephthalate (PET), a second clear outer layer comprising PET, and a core layer comprising PET arranged between the first and the second layer, wherein the core layer is mixed with at least one pigment.

9. The door of claim 1, wherein the door leaf forms a multi-layer roll in the open position.

10. The door of claim 1, wherein the door further includes a limiting assembly that limits the relative movement of the floatingly held edge region.

11. The door of claim 10, wherein the limiting assembly includes an extension of the floatingly held edge region in a thickness direction extending perpendicular to a door leaf plane spanned by the door leaf movement direction; and wherein the stabilizing device includes a receptacle formed in the stabilizing device for the extension of the floatingly held edge region, wherein the receptacle has a mouth penetrated by a transition region of the door leaf segment provided with the floatingly held edge region between the extension of the floatingly held edge region and a region of the door leaf segment provided with the floatingly held edge region that is exposed outside of the stabilizing device, wherein a width of the mouth in the thickness direction is greater than a thickness of the transition region in the thickness direction, but less than dimensions of the extension in the thickness direction.

12. The door of claim 11, wherein the receptacle is delimited by a bottom on its side opposite the mouth, wherein the distance between the mouth and the bottom in the door leaf movement direction is greater than the length of the extension of the floatingly held edge region in the door leaf movement direction.

13. The door of claim 11, wherein the extension is formed by bending the floating edge region, and includes a functional film with respect to a bending axis extending parallel to the stabilizing device.

14. The door of claim 11, characterized in that the extension of the floatingly held edge region is formed by thickening the floatingly held edge region.

15. The door of claim 11, wherein the extension of the floatingly held edge region is formed by an extension element held in a form-fitting, force-fitting, or materially bonded manner on the floatingly held edge region.

16. The door of claim 11, wherein the stabilizing device has at least two receptacle parts that are detachably connected to one another and that form mutually opposite bounding surfaces of the mouth.

17. A method for producing a door according to claim 1, the method comprising laminating the functional film onto the flexible base material, and holding the floatingly held edge region floating on the stabilizing device in such a way that a relative movement of the floatingly held edge region with respect to the stabilizing device is possible at least in the door leaf movement direction.

18. The method of claim 17, wherein the functional film includes an adhesive layer that is adhesively fixed to the flexible base material.

19. The method of claim 17, wherein the functional film and the base material pass through a nip formed between two rollers of a laminator.

20. The method of claim 17, wherein, when the functional film is laminated on, fluids are drained from a bounding layer formed between the functional film and the flexible base material.

21. The method according to claim 17, wherein the functional film is laminated onto the flexible base material in the form of a plastic web that includes polycarbonate, and that an edge of the plastic web provided with the functional film is bent over with respect to a bending line extending parallel to this edge.

* * * * *